(12) United States Patent
Ao et al.

(10) Patent No.: US 8,180,155 B2
(45) Date of Patent: May 15, 2012

(54) DECODING METHOD FOR A TWO DIMENSIONAL DOT CODE

(75) Inventors: Chen-Hua Ao, Longjing Shiang (TW); Yi-Hsin Tao, Hsinchu (TW)

(73) Assignee: Elan Microelectronics Corporation, Hsinchu (TW)

( * ) Notice: Subject to any disclaimer, the term of this patent is extended or adjusted under 35 U.S.C. 154(b) by 984 days.

(21) Appl. No.: 12/168,080

(22) Filed: Jul. 4, 2008

(65) Prior Publication Data

US 2009/0310871 A1    Dec. 17, 2009

(30) Foreign Application Priority Data

Jun. 17, 2008  (TW) ............................... 97122595 A

(51) Int. Cl.
*G06K 9/00* (2006.01)

(52) U.S. Cl. ...................................................... 382/181

(58) Field of Classification Search .................. 382/137, 382/181, 183, 218, 300; 235/462.1
See application file for complete search history.

(56) References Cited

U.S. PATENT DOCUMENTS

| | | | |
|---|---|---|---|
| 7,019,713 B2 * | 3/2006 | Hereld et al. ................... | 345/1.1 |
| 7,677,456 B2 * | 3/2010 | Uchida et al. .................. | 235/454 |
| 2008/0048044 A1 * | 2/2008 | Zhao et al. ..................... | 235/494 |
| 2009/0066977 A1 * | 3/2009 | Yoshida ......................... | 358/1.8 |

\* cited by examiner

*Primary Examiner* — Daniel Mariam
(74) *Attorney, Agent, or Firm* — Rosenberg, Klein & Lee

(57) ABSTRACT

A decoding method for a two dimensional dot code includes the steps of defining coordinates of boundary dots in the two dimensional dot code, performing extrapolation and interpolation according to the coordinates of the boundary dots to create coordinates of a plurality of virtual code dots, and comparing a code dot in the two dimensional dot code with the virtual code dots to extract information intended to be reproduced from the two dimensional dot code.

4 Claims, 5 Drawing Sheets

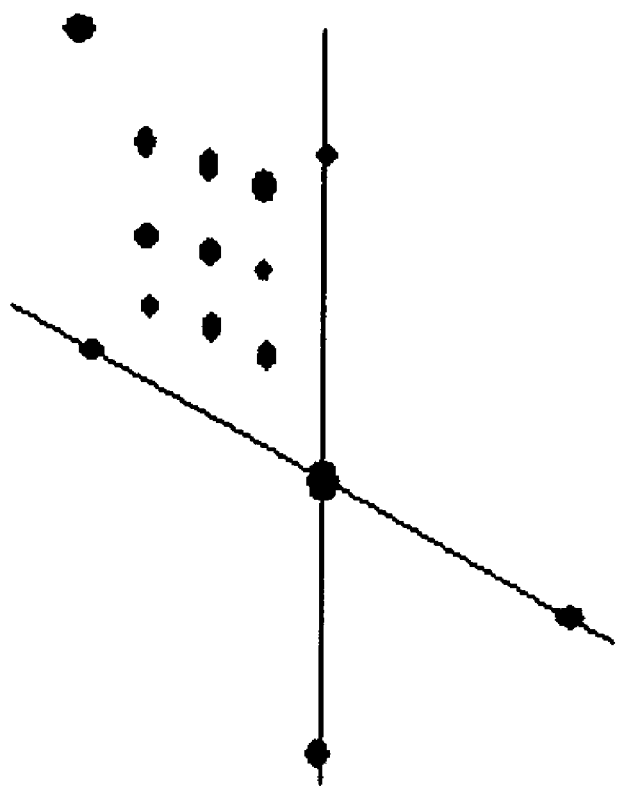
Fig. 6
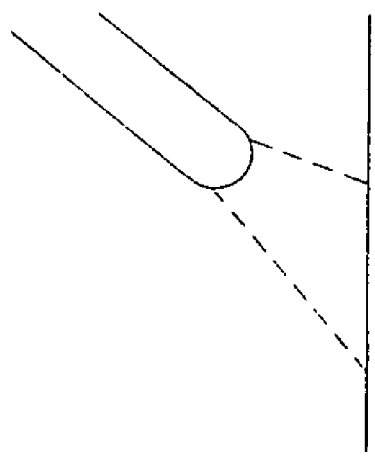

DECODING METHOD FOR A TWO DIMENSIONAL DOT CODE

FIELD OF THE INVENTION

The present invention is related generally to a graphical digital code and, more particularly, to a decoding method for a two dimensional dot code.

BACKGROUND OF THE INVENTION

A two dimensional dot code is a dot pattern printed under specific rules for reproducing specific information. Nowadays, two dimensional dot codes are often used in teaching materials, for example English teaching materials for children. In these teaching materials, behind the clearly printed main characters, relatively small and inconspicuous two dimensional dot codes are printed as the background of the main characters. A user reading the main characters can simultaneously scan the two dimensional dot codes in the background with an optical reader and thereby input the two dimensional dot codes into a computer or other devices, which decode the two dimensional dot codes and output corresponding information to make a strong impression of the main characters on the user. For instance, a two dimensional dot code read from the background of a main character of the English letter A may result in playback of an audio file containing the pronunciation of the letter A, or playback of a video file related to the letter A, such as one showing an apple falling from a tree.

Generally, a block of two dimensional dot code is composed of boundary dots, direction dots and code dots. To decode a two dimensional dot code, an optical reader is used to input the image of the two dimensional dot code into a decoding device, such as a computer. Each commercial company defines its own encoding rules, and thereby produces unique two dimensional dot codes in terms of positioning method, code dot distribution and code capacity. For instance, Taiwan Pat. No. 581,970 issued to Sonix Technology Co., Ltd. discloses a two dimensional dot code, in which boundary dots (a header group) arranged in an L shape define the range and direction of the two dimensional dot code, so that information represented by the block of two dimensional dot code can be deciphered according to positions of code dots in the block of two dimensional dot code. U.S. Pat. No. 6,548,768 issued to Pettersson et al. teaches a two dimensional dot code having no specific boundary dots. Instead, two code dots having the shortest spacing therebetween is first found out, virtual grid lines are plotted based on the two code dots to further define the dimensions of virtual grid cells, and finally a range of a block of two dimensional dot code is simulated to facilitate decoding. Presently, the maximum code capacity of a two dimensional dot code is $2^{32}$, made by encoding rules proposed by PixArt Imaging Inc.

Although encoding rules vary from company to company, decoding a two dimensional dot code always begins with determining an angular difference between an image of the two dimensional dot code and a preset direction according to boundary and direction dots because a scanned image of the two dimensional dot code is often skewed. Only when the image of the two dimensional dot code is rotationally corrected can information represented by the two dimensional dot code be determined according to the positions of code dots, before performing the action corresponding to the information. However, calculation of rotation is complicated and susceptible to misjudgment because not only are sine and cosine operations involved, but also the farther a code dot is from the center of rotation, the greater the error.

The present invention provides a decoding method for a two dimensional dot code, suitable for use with any two dimensional dot codes whose boundary dots and direction dots have certain geometric extrapolation and interpolation relations. With this method, positions of code dots in a two dimensional dot code can be rapidly determined without rotational correction so as to decode the two dimensional dot code speedily.

BRIEF SUMMARY OF THE INVENTION

An object of the present invention is to provide a decoding method for a two dimensional dot code.

Another object of the present invention is to provide a decoding method for a two dimensional dot code, which is not affected by a skew image of the two dimensional dot code.

According to the present invention, a decoding method for a two dimensional dot code includes the steps of defining coordinates of boundary dots, performing interpolation and extrapolation according to the coordinates of the boundary dots to create coordinates of a plurality of virtual code dots, and comparing a code dot with the virtual code dots to extract information intended to be reproduced from the two dimensional dot code.

Since the geometric interpolation and extrapolation relation among dots in an image of a two dimensional dot code is intact even when the image is a skew image of the two dimensional dot code, the decoding method of the present invention is applicable to an image taken slantingly of a two dimensional dot code.

BRIEF DESCRIPTION OF THE DRAWINGS

These and other objects, features and advantages of the present invention will become apparent to those skilled in the art upon consideration of the following description of the, preferred embodiments of the present invention taken in conjunction with the accompanying drawings, in which:

FIG. 6 is a schematic diagram for illustration of a skew image and how the skew image is taken, for showing that how the decoding method of the present invention is not influenced by the skew image.

DETAILED DESCRIPTION OF THE INVENTION

Figure 2:
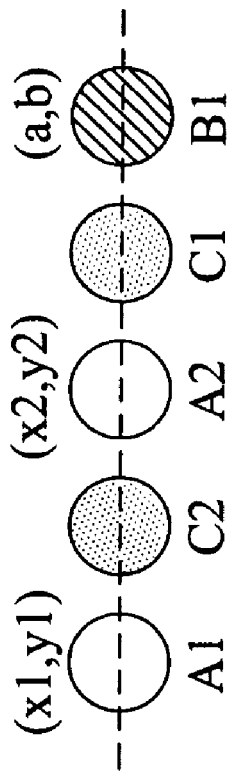
FIG. 2 is a schematic diagram for illustration of interpolation.
Figure 1:
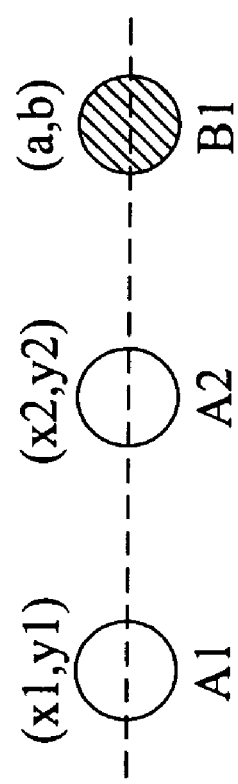
FIG. 1 is a schematic diagram for illustration of extrapolation.

The present invention provides a method for rapidly calculating virtual grid points and virtual code dots through extrapolation and interpolation. The principle of the present invention is first explained with reference to FIGS. 1 and 2. When the coordinates of known points A1 and A2 are (x1, y1) and (x2, y2) respectively, and the distance between the points A1 and A2 is equal to that between the point A2 and a point B1, extrapolation can be applied to determine the coordinates of the point B1 as (a, b). Then, the coordinates of points C1 and C2 between the points A2 and B1 and between the points A1 and A2 respectively, can be obtained by interpolation according to the coordinates of the points A1, A2 and B1. The present invention applies this concept of extrapolation and interpolation to a two dimensional dot code in order to rapidly simulate and create coordinates of virtual grid points and virtual code dots. Further explanation is provided hereunder with reference to a two dimensional dot code having five boundary dots arranged with a cross configuration.

Figure 3:
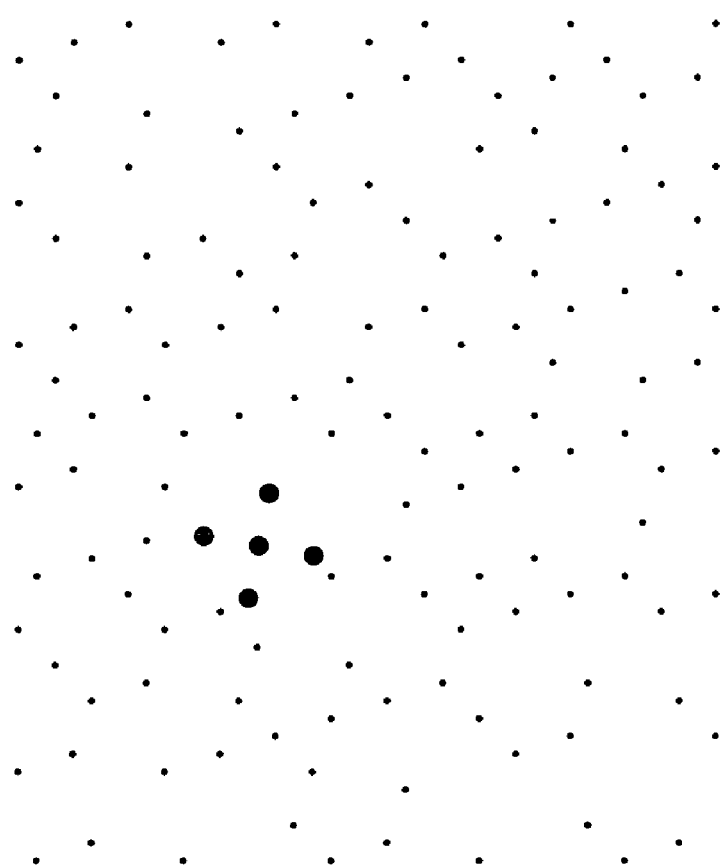
FIGS. 3 to 5 are schematic diagrams for illustrations of an embodiment according to the present invention.
Figure 4:
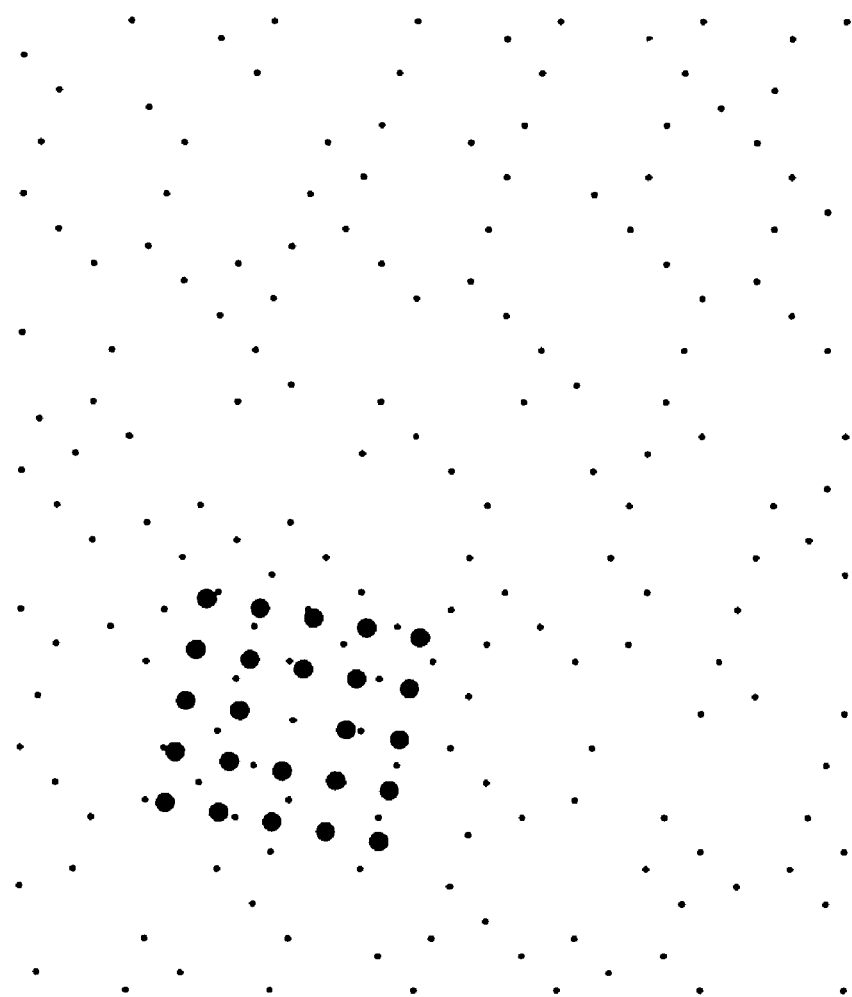
Figure 5:
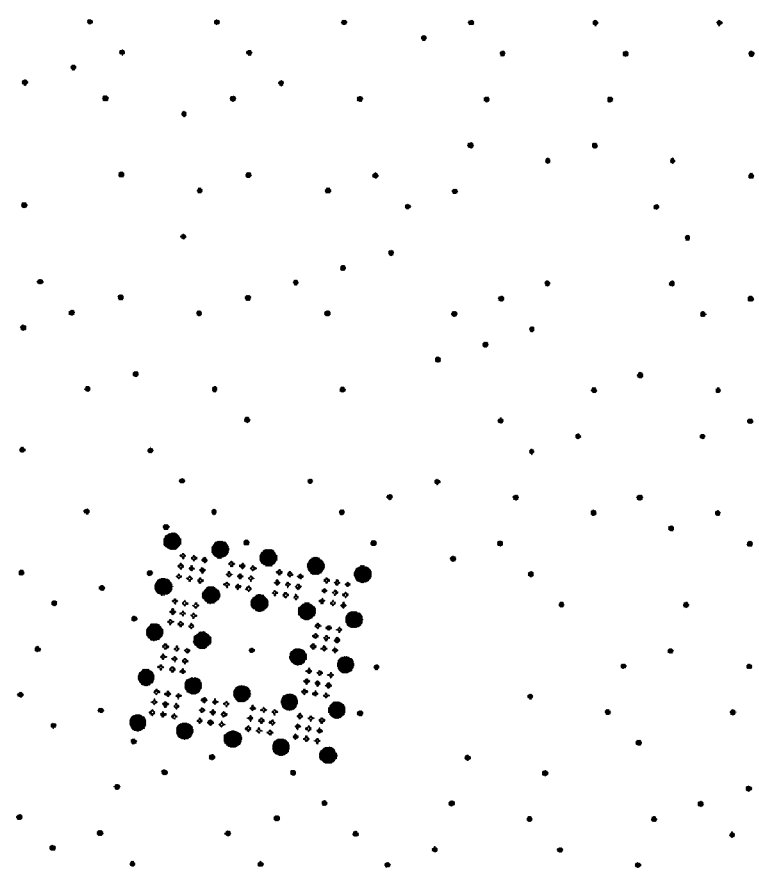

FIGS. 3 to 5 show a process in an embodiment according to the present invention. To begin with, an image of the aforesaid two dimensional dot code is inputted into a decoding device, and the five boundary dots forming the cross are found in the image, as shown in FIG. 3. Next, coordinates of the boundary dots are defined. In this embodiment, the origin of coordinates is defined at a lower left vertex of the obtained image. Then, extrapolation is applied to every two adjacent said boundary dots to generate virtual grid points extending in all directions from the boundary dots, as shown in FIG. 4, thereby defining a range of a block of two dimensional dot code and calculating coordinates of the virtual grid points. Four adjacent said virtual grid points together form a virtual grid cell. Following that, interpolation is applied to the coordinates of the virtual grid points to calculate coordinates of virtual code dots, which are distributed in a 3×3 array of virtual units in each of the virtual grid cells, as shown in FIG. 5. Then, the virtual code dots are compared with a real code dot to rapidly determine a position of the real code dot. Since all the boundary and code dots in this embodiment are defined with coordinates, the positional relation among the boundary and code dots can be precisely determined to avoid misjudgment. In other embodiments, the coordinates of the virtual grid points and the coordinates of the virtual code dots can be created according to directional information additionally provided by a direction dot in the two dimensional dot code.

As shown in FIG. 6, when a skew image is taken of a two dimensional dot code by an imaging-taking device, a geometric extrapolation and interpolation relation among dots in the image remains unchanged. Therefore, the decoding method of the present invention is applicable even when an image is taken askew.

Since the decoding method of the present invention does not involve rotational correction of images, it is not necessary to calculate rotation angles of the images. Consequently, the computing steps of the decoding method of the present invention are simplified.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A decoding method for a two dimensional dot code, comprising the steps of:
   defining coordinates of boundary dots in the two dimensional dot code;
   performing extrapolation and interpolation according to the coordinates of the boundary dots to create coordinates of a plurality of virtual code dots; and
   comparing a code dot in the two dimensional dot code with the virtual code dots;
   wherein the boundary dots are arranged as a cross, and the method is performed using a computer or processor.

2. The decoding method of claim 1, wherein the step of performing extrapolation and interpolation according to the coordinates of the boundary dots to create coordinates of a plurality of virtual code dots comprises the steps of:
   performing extrapolation according to the coordinates of the boundary dots to generate coordinates of a plurality of virtual grid points; and
   performing interpolation according to the coordinates of the virtual grid points to create the coordinates of the virtual code dots.

3. A decoding method for a two dimensional dot code, comprising the steps of:
   defining coordinates of boundary dots and coordinate of a direction dot in the two dimensional dot code;
   performing extrapolation and interpolation according to the coordinates of the boundary dots and the coordinate of the direction dot to create coordinates of a plurality of virtual code dots; and
   comparing a code dot in the two dimensional dot code with the virtual code dots;
   wherein the boundary dots are arranged as a cross, and the method is performed using a computer or processor.

4. The decoding method of claim 3, wherein the step of performing extrapolation and interpolation according to the coordinates of the boundary dots and the coordinate of the direction dot to create coordinates of a plurality of virtual code dots comprises the steps of:
   performing extrapolation according to the coordinates of the boundary dots and the coordinate of the direction dot to generate coordinates of a plurality of virtual grid points; and
   performing interpolation according to the coordinates of the virtual grid points to create the coordinates of the virtual code dots.

* * * * *